United States Patent
Prangley et al.

(10) Patent No.: US 10,977,592 B2
(45) Date of Patent: Apr. 13, 2021

(54) SYSTEMS AND METHODS FOR WORKSITE SAFETY MANAGEMENT AND TRACKING

(71) Applicant: Infratech Corporation, Kennesaw, GA (US)

(72) Inventors: Christopher Vincent Prangley, Kennesaw, GA (US); Brandon Wayne Wilson, Smyrna, GA (US)

(73) Assignee: Infratech Corp., Kennesaw, GA (US)

( * ) Notice: Subject to any disclaimer, the term of this patent is extended or adjusted under 35 U.S.C. 154(b) by 481 days.

(21) Appl. No.: 15/214,855

(22) Filed: Jul. 20, 2016

(65) Prior Publication Data

US 2017/0024684 A1 Jan. 26, 2017

Related U.S. Application Data

(60) Provisional application No. 62/194,437, filed on Jul. 20, 2015.

(51) Int. Cl.
| | |
|---|---|
| G06Q 10/06 | (2012.01) |
| G09B 19/00 | (2006.01) |
| G09B 5/00 | (2006.01) |
| H04W 12/06 | (2021.01) |
| H04W 12/00 | (2021.01) |
| H04L 29/08 | (2006.01) |

(52) U.S. Cl.
CPC ....... *G06Q 10/063118* (2013.01); *G09B 5/00* (2013.01); *G09B 19/00* (2013.01); *H04L 67/1095* (2013.01); *H04W 12/06* (2013.01); *H04W 12/00522* (2019.01)

(58) Field of Classification Search
CPC .. G06Q 10/063118; G06Q 10/00; G09B 5/00; G09B 19/00; H04L 67/1095; H04W 12/06

USPC ......................................................... 705/7.17
See application file for complete search history.

(56) References Cited

U.S. PATENT DOCUMENTS

| | | | | |
|---|---|---|---|---|
| 6,345,259 B1* | 2/2002 | Sandoval | ............... | G06Q 10/06 705/7.11 |
| 8,131,118 B1* | 3/2012 | Jing | ........................ | G01C 21/30 382/305 |
| 8,936,198 B1* | 1/2015 | Eddey | .................. | G06Q 10/101 235/492 |
| 2003/0023476 A1* | 1/2003 | Gainey | ............ | G06Q 10/06398 705/7.42 |

(Continued)

OTHER PUBLICATIONS

Hyungeun Kim, Naruo Kano, Comparison of construction photograph and VR image in construction progress, Automation in Construction 17 (2008) 137-143, (Year: 2008).*

(Continued)

*Primary Examiner* — Rutao Wu
*Assistant Examiner* — Abdallah A El-Hage Hassan
(74) *Attorney, Agent, or Firm* — Thomas Horstemeyer, LLP

(57) ABSTRACT

Disclosed are various embodiments of worksite systems and methods that render user interfaces to provide features based on permissions of a user account. A user of a client device can create and store incident reports including photographs depicting the incident. The incident report can be synchronized with a remote data store through a synchronization service on an application server. A vehicle status report can also be created and stored on the client device and synchronized with the application server.

20 Claims, 8 Drawing Sheets

(56) References Cited

U.S. PATENT DOCUMENTS

| | | | | |
|---|---|---|---|---|
| 2005/0101334 A1* | 5/2005 | Brown | .................... | H04L 67/22 |
| | | | | 455/456.3 |
| 2007/0294258 A1* | 12/2007 | Caldwell | ................ | G06Q 10/10 |
| 2010/0117654 A1* | 5/2010 | Nielsen | ................. | G06Q 10/06 |
| | | | | 324/326 |
| 2011/0150324 A1* | 6/2011 | Ngan | ................... | G06K 9/4671 |
| | | | | 382/159 |
| 2013/0036031 A1* | 2/2013 | Hutchinson | ............ | G06Q 10/10 |
| | | | | 705/30 |
| 2014/0180730 A1* | 6/2014 | Cordova | ............... | H04W 4/029 |
| | | | | 705/4 |
| 2015/0278733 A1* | 10/2015 | Lakshmanan | .... | G06Q 10/06312 |
| | | | | 705/7.22 |
| 2016/0035251 A1* | 2/2016 | Delplace | ............. | G09B 19/003 |
| | | | | 434/66 |

OTHER PUBLICATIONS

Nikolaj Groeneweg, Bastiaan de Groot, Arvid Halma, Bernardo Quiroga, Maarten Tromp, DOAS 2006 Project Article: Mobile Landmark Recognition, {njgroene, brgoot, ahalma, bquiroga, mtromp}@science.uva.nl Feb. 2, 2006, (Year: 2006).*

* cited by examiner

300 → 303

| | | |
|---|---|---|
| Home | Incident Report | Foreman \| Sign Out |

| | |
|---|---|
| Job # | 05397-03 ▽ |
| Task | Task # or Name ▽ |
| Hit ID | |
| Date Reported | 5/8/2016 |
| Picture Due | 5/19/2016 |
| Supervisor | |
| Customer | |
| Contract | |
| Crew | 104 ▽ |
| Date | 5/14/2016 |
| UH Type | Electric ▽ |
| Foreman | ☐ All        ▽ |
| Address | |
| Claimant | ▽   Add New |

306

Save — 309    Capture Picture — 312    Cancel — 315

| Home | Equipment Pre-Check | Foreman | Sign Out |

503
- Name: ☐  Crew: ☐
- Area: ☐  Description: ☐
- Date: ☐  Start Time: ☐
- Break Time: ☐  End Time: ☐
- Mileage/Hours: ☐

Truck Number: ☐

506
- ☐ Air Compressor    ☐ Front Axle      ☐ Safety Equipment
- ☐ Air Lines         ☐ Fuel Tanks      ☐ Fire Extinguisher
- ☐ Battery           ☐ Gauges          ☐ Reflective Triangles Trailer Number: ☐

509
- ☐ Brake Connection  ☐ Hitch           ☐ Suspension
- ☐ Brakes            ☐ Landing Gear    ☐ Trailer Connections
- ☐ Coupling Devices  ☐ Lights          ☐ Wheels and Rims Aux Equipment Number: ☐

512
- ☐ Belts             ☐ Coolant         ☐ Leaks
- ☐ Boom Conditions   ☐ Engine Oil Level ☐ Muffler
- ☐ Controls          ☐ Filters         ☐ Water Level Comments 515

518
- ☐ Above Defects Corrected
- ☐ Above Defects Need Not Be Corrected for Safe Operation
- ☒ Email ( Submit ) 521

| Home | Daily Field Report Entry | John Smith | Sign Out |

603
- Customer Name: ____
- Contract #: ____
- Supervisor Name: ____
- Work Date: ____
- Job Briefing: [X]
- Task #: ____
- WO #: ____
- Foreman Name: ____
- Crew: ____

Report Incidental Event (If Applicable) — 606

- Utility Hit  ● Yes  ○ No    Vehicle Accident  ● Yes  ○ No
- Personal Injury  ○ Yes  ● No

Enter Daily Status — 609

- DFR Status: ____
- Delay Type: ____
- Comments: ____

Email Addresses — 612

- Email: [X]
- Email Addresses: ____    (Add Emails) — 615

(Submit) — 618

FIG. 6

SYSTEMS AND METHODS FOR WORKSITE SAFETY MANAGEMENT AND TRACKING

CROSS-REFERENCE TO RELATED APPLICATIONS

This application claims the benefit of U.S. Provisional Application No. 62/194,437, filed on Jul. 20, 2015, the entire contents of which is hereby incorporated herein by reference.

BACKGROUND

In construction, a company can have multiple customers and working crews to service those customers. Each work site requires a different set of tasks to be completed based on what the customer needs. Workers may need to perform training before performing certain functions at a work site. A foreman needs to track the workers on various crews to ensure the work is done on time and with quality. Further, when accidents happen, someone needs to ensure damage from the accident is mitigated.

SUMMARY

A client device that executes a client application can authenticate a user account with an application server, such as a worksite service. The authentication can be based on an authentication credential. The client application can render a dashboard user interface with buttons corresponding to features available on the client device. The availability can be based on permissions for the user account.

When a feature is selected from the dashboard user interface, the client application can render a second user interface that can receive information describing an incident. The second user interface can include user interface elements for creating an incident report. A photograph can be captured by a camera on the client device and stored as part of the incident report. The photograph can depict the incident.

The incident report can be stored in a data store including information describing the incident and any photographs related to the incident. The data store can be located on the client device and the incident report can be synchronized with a remote data store on the application server.

These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the embodiments and the advantages thereof, reference is now made to the following description, in conjunction with the accompanying figures briefly described as follows:

FIGS. 2-6 illustrate user interfaces rendered by a client in the networked environment of FIG. 1 according to various example embodiments;

Figure 1:
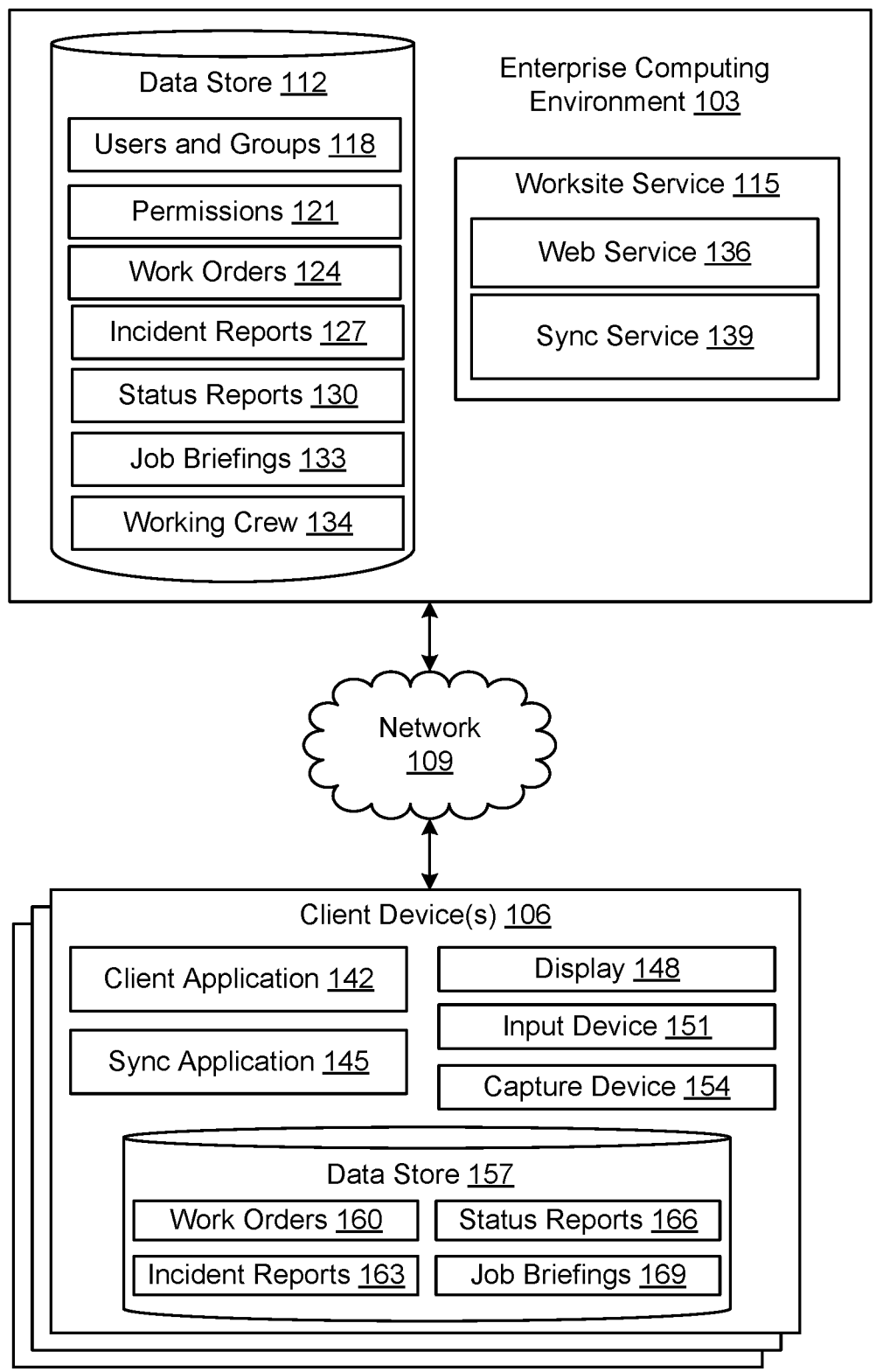
FIG. 1 is a drawing of a networked environment according to various example embodiments.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present invention" refers to any one of the embodiments of the invention described herein and any equivalents. Furthermore, reference to various feature(s) of the "present invention" is not to suggest that all embodiments must include the referenced feature(s).

Among embodiments, some aspects of the present invention are implemented by a computer program executed by one or more processors, as described and illustrated. As would be apparent to one having ordinary skill in the art, the present invention may be implemented, at least in part, by computer-readable instructions in various forms, and the present invention is not intended to be limiting to a particular set or sequence of instructions executed by the processor.

The embodiments described herein are not limited in application to the details set forth in the following description or illustrated in the drawings. The invention is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above. Turning now to the drawings, exemplary embodiments are described in detail.

With reference to FIG. 1, shown is a networked environment 100 according to various embodiments of the present disclosure. The networked environment 100 can include a computing environment 103 and one or more client device (s) 106. The computing environment 103 and client devices 106 can communicate through a network 109. The computing environment 103 can include a data store 112 and a worksite service 115. The client devices 106 can be a cell phone, a tablet, a laptop, a desktop, a television, a custom embedded device, or other computing devices.

The data store can include users and groups 118, permissions 121, work orders 124, incident reports 127, status reports 130, job briefings 133, and other data. The users and groups 118 can include user accounts corresponding to users of client devices 106 or to groups of users of client devices 106. The users and groups 118 can include groups that user accounts can be assigned to. The user accounts assigned to a group can inherit properties of the group, such as permissions 121.

Permissions 121 can include data describing access rights for each of the users and groups 118. As an example, permissions 121 can specify that a group from users and groups 118 named "Foreman" can access detailed records of working crews 134, while a group named "Working Crew" cannot. As another example, the permissions 121 can specify that a user of users and groups 118 named "John Smith" can upload photographs for work orders. The permissions 121 can be time sensitive. For example, a permission 121 can authorize a user account to perform an operation for a limited period of time or during a specific recurring time period, such as during business hours.

The worksite services 115 can include a web service 136 and a sync service 139. The web service 136 can generate user interfaces to be supplied to the client device 106. As an example, the web service 136 can generate web pages to be displayed by a web browser on the client device 106. As another example, the web service 136 can respond to data requests from smart phone apps. The data requests can be in the form of Java Script Object Notation (JSON) requests. The web service 136 can also generate notification requests. The notification requests can be sent to third party servers, such as a smart phone company's notification services.

The web service 136 can receive a request to change a permission level from an administrative user. The web service 136 can update permissions 121 based on data associated with the request. The web service 136 can verify that a user account has permission to change permission levels based on permissions 121. In some embodiments, a user account is an administrative user when an additional security threshold is met. As an example, the web service 136 can require the user account is designated as an administrative user in a configuration file stored on a storage device associated with the computing environment 103.

The client device 106 can include a client application 142, a sync application 145, one or more displays 148, one or more input devices 151, one or more capture devices 154, and a local data store 157. The client application 142 can be a smartphone app, a web browser, a service, or any other application executing at least in part on a client device. The display 148 can be a liquid crystal display (LCD) or a light emitting diode (LED) display. The input devices 151 can include a touch screen, a microphone, auxiliary inputs, a light sensor, physical buttons, a wireless communication device, or other input devices. The capture device 154 can include a camera, a Radio Frequency Identification (RFID) tag reader, and other capture devices. A capture device 154 can also be an input device 151.

The local data store 157 can include work orders 160, incident reports 163, status reports 166, and job briefings 169. In some embodiments, a local data store can be omitted. In these embodiments, the client device 106 accesses the data in work orders 124, incident reports 127, status reports 130, and job briefings 133 in place of include work orders 160, incident reports 163, status reports 166, and job briefings 169, respectively. The client device 106 can access data store 112 through network 109.

The sync service 139 and sync application 145 can communicate to push and pull changes from a client device 106. As an example, the sync application 145 can push changes to data store 157 and pull changes from data store 112 by transmitting requests to the sync service 139, and the sync service 139 can store the changes in data store 112 and retrieve any changes from the data store 112. Similarly, the sync service 139 can pull changes from the client device 106 and push changes to the client device 106 by communicating with sync application 145.

The sync service 139 can verify that the user account associated with the sync application 145 has permissions 121 to update data store 112. The permissions 121 can specify different levels of access for pushing and/or pulling data to work orders 124, incident reports 127, status reports 130, and job briefings 133.

The worksite service 115 can determine a duration a current task in a work order 124 exceeds a threshold. The worksite service 115 can identify a cause of the delay, such as, for example, a delay in materials to complete the job, a delay in customer approval, a delay caused by bad engineering, a delay caused by a project already being done, a weather based delay, and other causes for delay. For example, a status report 130 can indicate that a work order 124 was already completed when a working crew 134 arrived to complete the work order. As another example, a working crew 134 can spend time in addition to the time budgeted for a project because of bad engineering. The working crew 134 can use the client application 142 to identify the bad engineering as the cause of the delay. In yet another example, a customer may delay in granting approval to begin a task of a work order 124. The worksite service 115 can identify the task as causing the delay and data associated with the task can identify the task as performed by the customer.

The worksite service 115 can determine a cost to charge a customer based on the delay. As an example, the worksite service 115 can bill a customer for hours lost due to a delay, such as, for the customer ordering work that is already completed. Further, the worksite service 115 can determine a number of hours lost due to the delay based on time entered in a status report 130 or job briefing 133.

A client device 106 can authenticate a user account with a computing environment 103. The authentication can be based on an authentication credential included with a request to authenticate a user account.

Figure 2:
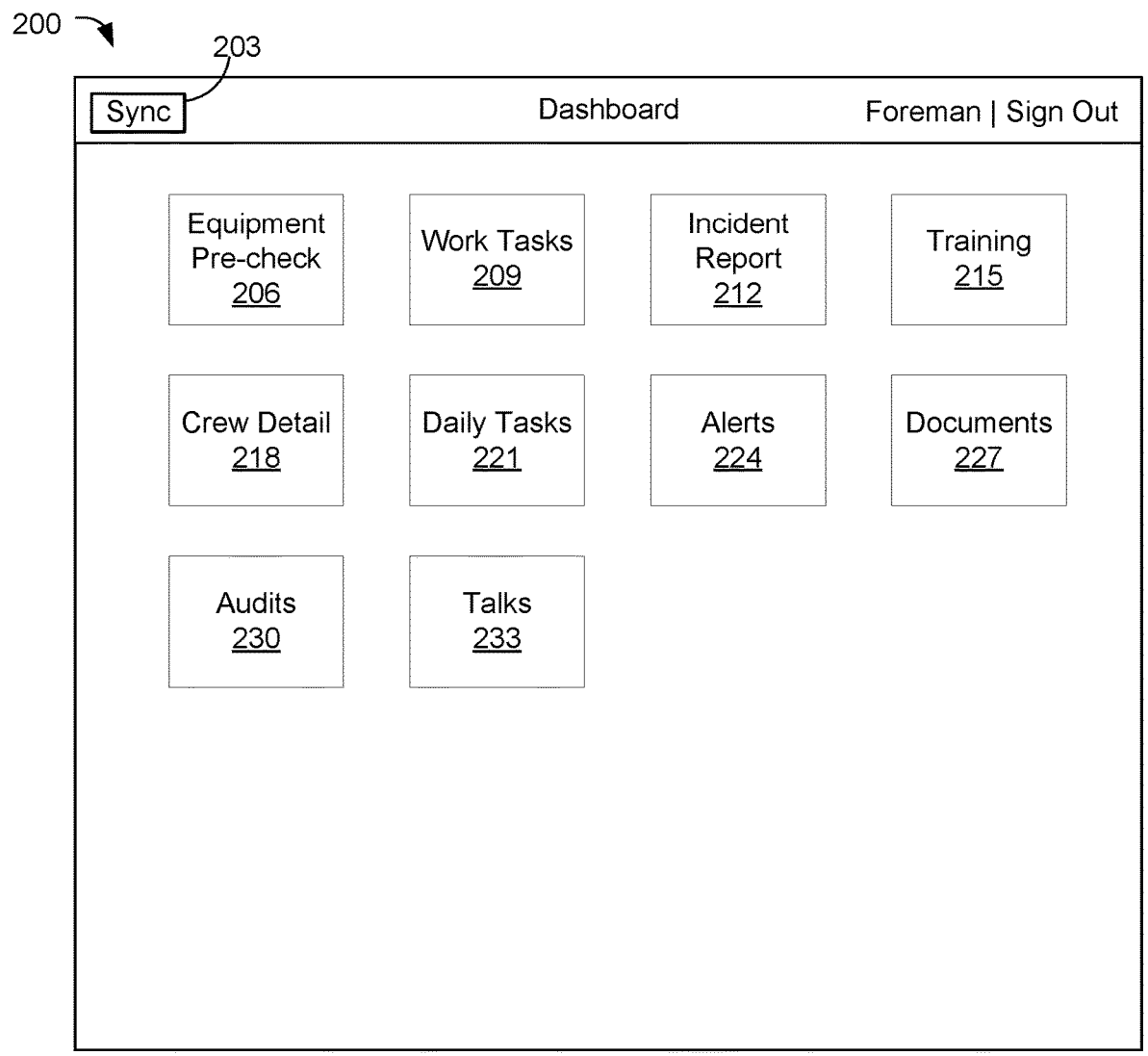

Turning to FIG. 2, shown is a dashboard user interface 200 rendered on a display of a client device 106 according to various embodiments of the present disclosure. The client application 142 can render the dashboard user interface 200 on a display 148 including one or more user interface elements. It is understood that the user interface elements provide a mechanism to navigate through the functionality contained herein, and may be in a variety of structures, for example in a hierarchical tree structure of links.

The dashboard user interface 200 can include a sync element 203, an equipment pre-check element 206, a work task element 209, an incident report element 212, a training element 215, a crew detail element 218, a daily task element 221, an alerts element 224, a documents element 227, an audits element 230, and a talks element 233. Data between the client device 106 and the computing environment can be synced when the sync element 203 is selected.

When one of the user interface elements is selected or manipulated, the client application 142 can perform an operation based on which of the elements is selected. For example, the client application 142 can render a new incident user interface when the incident report element 212 is selected. As another example, the client application 142 can render a work order detail user interface when the work tasks element 209 is selected.

The client application 142 can render a vehicle status user interface when the equipment pre-check element 206 is selected. A daily field report user interface can be rendered if the daily tasks element 221 is selected. In some embodiments, the client application 142 can load a different user interface that leads to the specified user interface when an element is selected.

The client application 142 can render materials for training if the training element 215 is selected and a detail of the crew members in a working crew 134 when crew detail element 218 is selected. The talk element 233 can cause the client application 142 to render a list of videos available to be rendered. A video can be selected and then streamed from the computing environment 103. Similarly, the documents element 227 can cause the client application to render a list of documents available to be viewed on the client device 106. The client application 142 can render any alerts, messages, or notifications corresponding to a user account when the alerts element 224 is selected.

The worksite service 115 can determine recommendations for training materials based on a job position of crew members in a working crew 134. The recommendation for a training material can also be based on skill associated with the job position, a history of completed training materials for the crew members, and other crew member information.

If an audit score, such from a spot audit or safety audit, falls below a threshold, the worksite service 115 can assign remedial training materials to one or more working crews 134. The remedial training materials may be assigned based on which sub-scores of the audit score is the lowest. As an example, a sub-score related to forklift safety may be the lowest score because several spot audits of work sites revealed working crews 134 improperly following forklift safety guidelines. As such, forklift safety training can be assigned to working crews 134 that are authorized to drive a forklift. The audit score can include factors, such as, utility hits per mile, vehicle accidents per man hour, injuries per man hour, and other factors. The worksite service 115 can determine each of these factors based on incident reports 127, among other data in data store 112.

The dashboard user interface 200 can omit one or more of the user interface elements based on permissions 121 associated with a user account on the client device 106. The user interface elements can individually correspond to features that the user account is authorized to access. The authorization to access for a user account can be based on permissions 121 including user account permissions and on permissions for any groups that the user account is associated with.

When the sync element 203 is manipulated, a local data store 157 of a client device 106 can be synchronized with a remote data store 112 of a computing environment 103. The local data store 157 can be synchronized with the remote data store 112 on a predefined interval without user intervention. The synchronization can be based on the availability of an internet connection over network 109 for the client device 106 or on a type of internet connection available on the client device 106. As an example, a synchronization can be queued until the client device 106 can connect to the internet over a WIFI connection even though a cellular data connection is available.

With respect to FIG. 3, shown is a new incident report user interface 300 rendered by the client application 142 on a client device 106 according to various embodiments of the present disclosure. The new incident report user interface 300 can include a home button 303, data fields 306, a save button 309, a capture button 312, and a cancel button 315. The data stored in data fields 306 can be saved to the data store 112 or 157 as an incident report 127 or 163 when the save button 309 is selected.

When the incident report element 212 is manipulated through an input device 151, a new incident report can be created. As an example, a new incident report user interface 300 can be rendered on the display 148 by the client device 106. The new incident report user interface 300 can receive information in the data fields 306 that describes an incident. The cancel button 315 can discard changes entered into the data fields 306. The client application 142 can capture a photograph with the capture device 154 of the client device 106 when the capture button 312 is selected. The new incident user interface can include multiple fields to receive user input of information related to the new incident beyond those shown in data fields 306.

The information input into the new incident report user interface 300 can be stored in a data store 112 or 157. The information can include photographs related to the incident. A newly created incident report can be stored in a local data store 157, and then pushed to the remote data store 112 by the sync application 145 as part of a synchronization.

The client application 142 can search for a work order 160 by identifying a unique identifier on a packet corresponding to the work order 160. The packet can include a collection of papers, a package, a sticker, or other items. A capture device 154 can capture a visual representation of the unique identifier from the packet. As an example, the capture device 154 can capture a photograph depicting the packet. The client application 142 can perform an image analysis to determine the unique identifier represented in the photograph, such as a barcode, a QR code, or other identifying information.

The client application 142 can transmit the photograph to the web service 136, and the web service 136 can perform the image analysis. The client application 142 and the web service 136 can also perform the image analysis in tandem. In one embodiment, the client application 142 identifies a depicted item within a photograph and sends a smaller image that includes the identified item to the web service 136 for further analysis. The web service 136 can recognize text in the photograph to determine the unique identifier.

In one embodiment, the photograph depicts a job site associated with the work order 124 or 160. The client application 142 or web service 136 can compare the photograph to previously captured images of each worksite stored in data store 112 or 157 to identify the worksite and determine a unique identifier associated with the worksite based on the comparison. The comparison can be based on identifying one or more physical building or structure depicted within the photograph and the previously captured images of each worksite. The web service 136 can—process the previously captured images of each worksite to generate data describing each physical building or structure depicted in the images and store the data store 112 to expedite future processing.

A unique identifier for a work order 124 or 160 can correspond to a wireless antenna. The wireless antenna can be an RFID tag or other antenna device. The client device 106 can include an input device 151 or capture device 154 that can read RFID tags. In one example, the client device 106 reads a unique identifier from an RFID tag corresponding to the work order 124 or 160.

Figure 4:
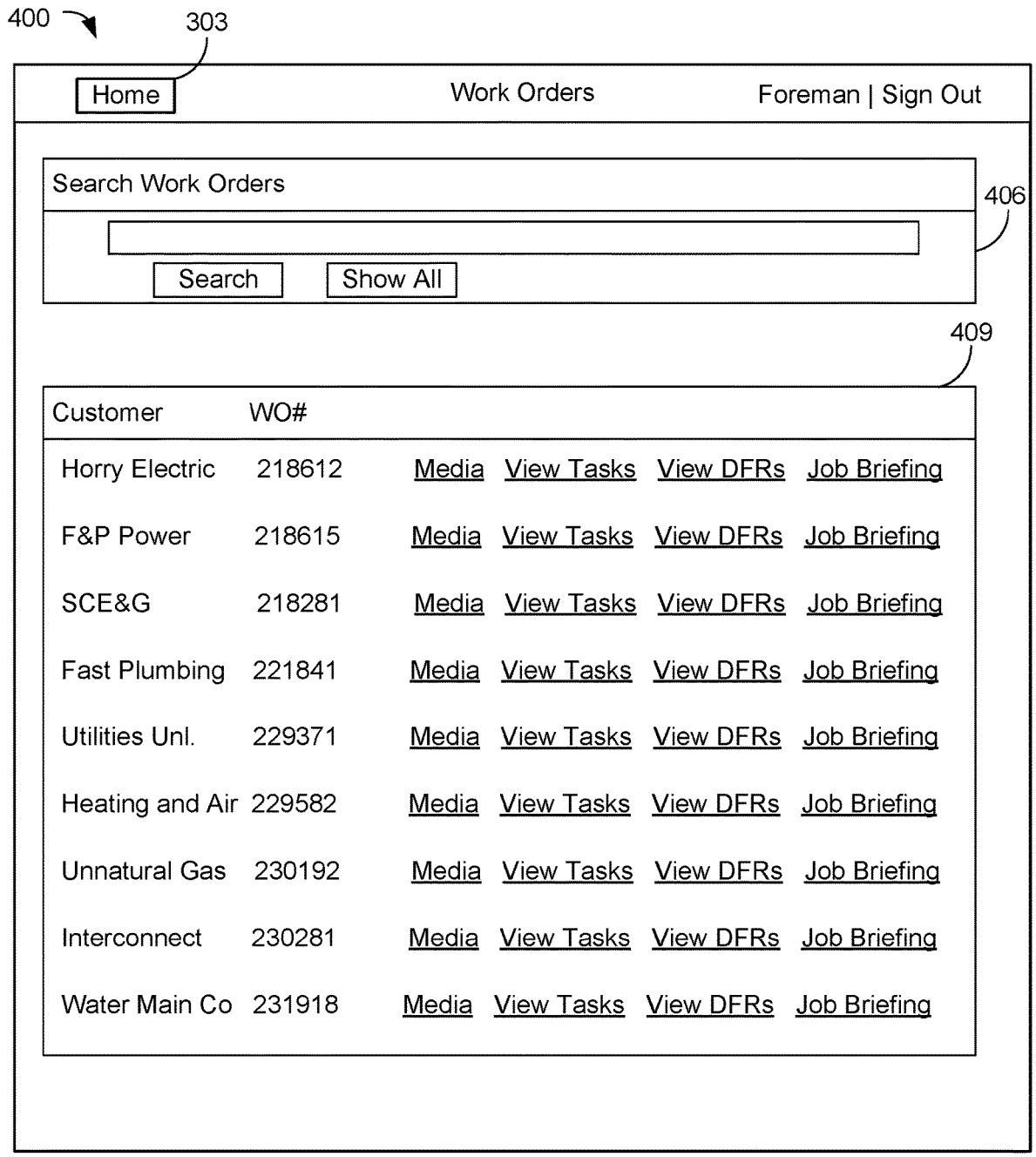

With reference to FIG. 4, shown is a work order detail user interface 400 rendered on a display 148 by a client application 142 according to various embodiments. The work order detail user interface 400 can include a home button 303, a search interface 406, and a details interface 409. The search interface 406 can be used to search for work orders 124 and 160. The details interface 409 can include details about one or more work orders 124 or 160. The details interface 409 can also include links to view other information related to each work order 124 or 160, such as media, tasks, daily reports, or job briefings 133 or 169 associated with a work order 124 or 160.

The work order detail user interface 400 can be limited to include details corresponding only to the unique identifier. The work order detail user interface 400 can be rendered in response to determining a unique identifier. In one example, the client application 142 renders the work order detail user interface 400 in response to reading an RFID corresponding to a work order 124 or 160.

When a unique identifier corresponding to a first work order 124 or 160 is searched, the work order detail user interface 400 can include details of the first work order 124 or 160 and details of any work orders 124 and 160 related to the first work order 124 or 160. In one embodiment, the work order detail user interface 400 includes details for work orders 160 stored in a local data store 157 and excludes any work orders created subsequent to the last synchronization event, which might be stored in work orders 124.

With reference to FIG. 5, shown is a vehicle status user interface 500 rendered on a display 148 by a client application 142 according to various embodiments. The vehicle status user interface 500 can include a home button, various data fields 503, 506, 509, 512, 515, and 518, and a submit button 521. Data fields 503 can correspond to the overall report while data fields 506 correspond to a truck, data fields 509 correspond to a trailer, data fields 512 correspond to auxiliary equipment, data field 515 allows a user to enter comments, and data fields 518 indicate status of the report.

The client application 142 can generate and render the vehicle status user interface 500 to receive information describing the current state of a vehicle. The information in the data fields 503, 506, 509, 512, 515, and 518 can be generated and populated based on the data store 112 or 157 and/or manually entered by a user associated with the client device. The information describing the current state of the vehicle can include information describing the state of a trailer, auxiliary equipment, or other equipment associated with the vehicle.

The client application 142 can save a vehicle status report as a status report 130 or 166 based on the information in the vehicle status user interface. The vehicle status report can be saved when submit button 521 is manipulated, such as via an input device 151. The client application 142 can generate a work order details user interface 400 corresponding to a work order 124 or 160 that the vehicle is being used for when the vehicle status report is saved. In one embodiment, the work order details user interface is inaccessible until a vehicle status report has been saved for the current day.

The client application 142 or the web service 136 can send a notification when a vehicle status report is submitted. The notification can also be sent if a vehicle status report has not been submitted within a predefined time frame during the current day. The notification can be sent to a supervisor of the user account that submits the vehicle status report.

With reference to FIG. 6, shown is a daily field report user interface 600 rendered on a display 148 by a client application 142 according to various embodiments. The daily field report user interface 600 can include various data fields 603, 606, 609, and 612, an add email button 615, and a submit button 618.

A daily field report user interface can be rendered if the daily tasks element 221 is selected.

When the daily tasks element 221 is manipulated, the client application 142 can determine whether a job briefing 133 or 169 for a job task has been read by a user associated with a current user account. If the job briefing 133 or 169 has been read by the current user account, the client application 142 can generate a daily field report user interface 600. Otherwise, the client application 142 can generate a user interface including a job briefing 133 or 169 for the user to read the job briefing 133 or 169 or render a notification indicating the job briefing 133 or 169 must be confirmed. The client application 142 can update a status to indicate that a user associated with the current account has read the job briefing 133 or 169.

The daily field report user interface 600 can include details of a daily field report stored in status reports 130 or 166 that are related to a job task. Job tasks can also be stored in data store 112 or 157. Some details of the daily field report can be populated from a data store 112 or 157, while others can be manually entered by a user. In one example, a user can edit some details populated from the data store 112 or 157. The daily field report can include details describing a personal injury, details describing a vehicle accident, details describing a utility being hit, or other incident related details, such as details stored in incident reports 127 or 163. The details can be input through data fields 603, 606, 609, 612, or other data fields not shown.

Figure 7:
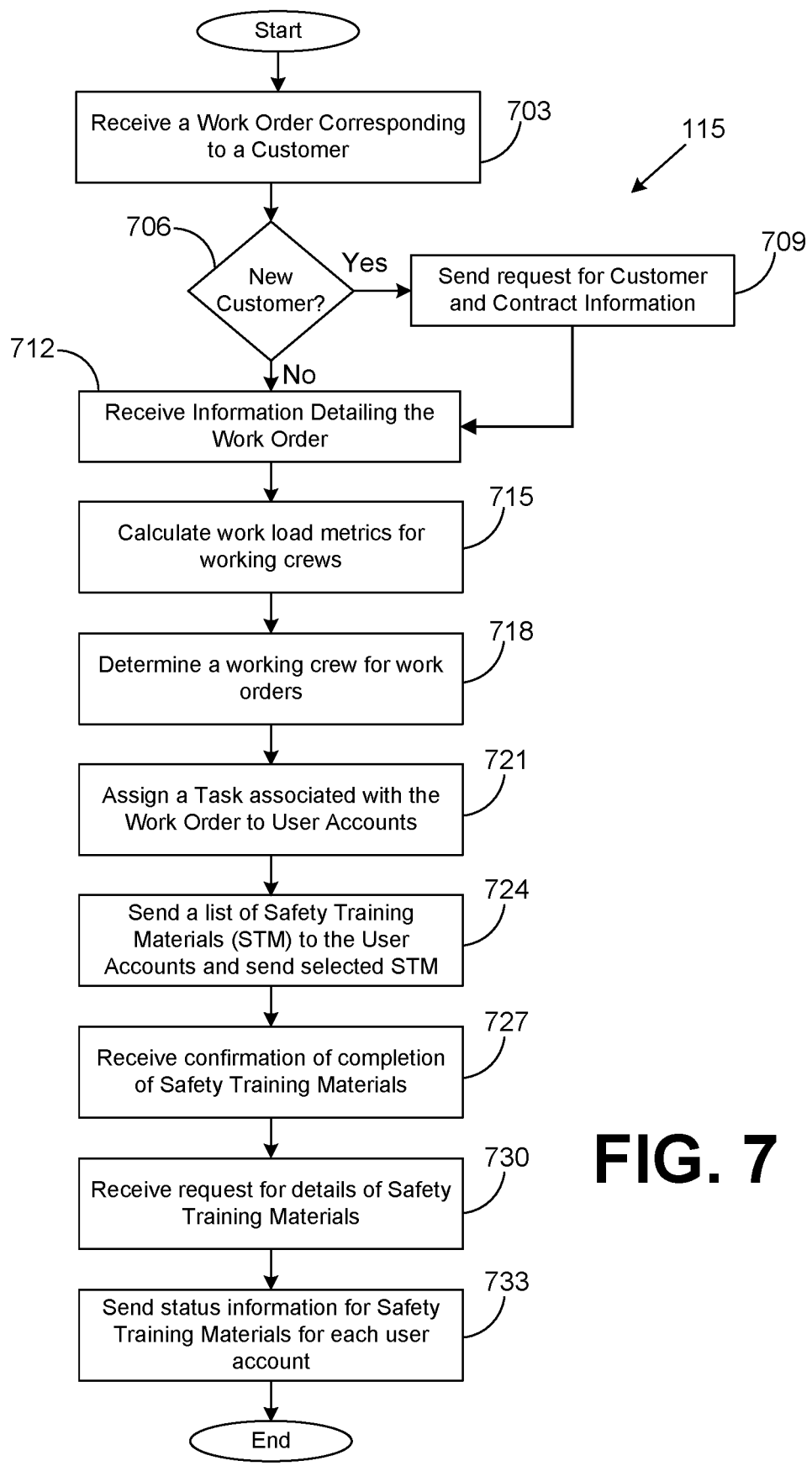
FIG. 7 illustrates an example flowchart of certain functionality implemented by portions of a worksite service executed in a computing environment in the networked environment of FIG. 1 according to various embodiments of the present disclosure.

Before turning to the process flow diagrams of FIG. 7, it is noted that embodiments described herein may be practiced using an alternative order of the steps illustrated in FIG. 7. That is, the process flows illustrated in FIG. 7 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments.

In box 703, the worksite service 115 can receive a work order 124 from a customer. For example, the customer can access the web service 136 from a client device 106 and submit a work order 124. In some embodiments, a work order 160 can be received as a work order 124 by sync service 139 as part of a synchronization event with a client device 106. The worksite service 115 can receive details from the customer detailing the work order 124.

In box 706, a determination is made whether the customer is a new customer. If the customer is a new customer, worksite service 115 proceeds to box 709; otherwise, the worksite service 115 proceeds to box 712.

At box 709, the web service 136 sends a request for customer information and contract information to the customer. The web service 136 can create a new user account for the new customer in users and groups 118.

At box 712, the worksite service 115 can receive information detailing the work order. The web service 136 can create a work order 124 corresponding to the submitted work order. The worksite service 115 can generate tasks associated with the work order 124. The tasks generated can be based on the type of work order 124 submitted and on the details provided by the customer regarding the work order 124. The web service can generate any necessary tasks to complete the work order 124 and assign a task to review the work order 124.

When a work order 124 is completed, an invoice can be generated for a customer. The worksite service 115 can generate the invoice in response to completion of the work order 124 without user interaction. In one embodiment, a user must approve the invoice prior to the invoice being sent to a customer. In another embodiment, the invoice is automatically mailed to a customer without user interaction.

The worksite service 115 can also analyze the productivity for each work order 124. As an example, the worksite service 115 can determine a number of hours billed on the work order 124 for working crews 134 and a budgeted number of hours to be billed on the work order 124. The worksite service 115 can send a recommendation to adjust future estimates for a type of work corresponding to the work order 124 based on a comparison of the number of hours billed to the budgeted number of hours to be billed. For example, if a type of work order 124 is charged to a customer at 100 hours of work, but on average over seventeen work orders 124, working crews 134 requires 125 hours to complete the work order 124, then the worksite service 115 can recommend adjusting the budgeted number of hours from 100 to 125 for future estimates of that type of work order 124.

In box 715, the worksite service 115 can calculate a work load metric for each of the working crews 134. The work load metric can be based on a respective number of tasks assigned to each working crew 134. The work load metric can also be based on due dates corresponding to each of the assigned tasks for each working crew 134. In box 718, a working crew can be determined based on the calculated metrics In box 721, the worksite service 115 can assign tasks based on a current work load of one or more working crews 134. A working crew 134 can be selected to assign tasks based on the calculated work load metrics. The web service 136 can assign the tasks to one or more user account. In one example, when a task is assigned to a user account that corresponds to a working crew 134, the web service 136 can also assign a user account of a foreman for the work crew to the task. A user account associated with a working crew 134 can be a single user account for the entire working crew 134, a single user account for one person on the working crew 134, or multiple user accounts for multiple people on the working crew 134.

The web service 136 can receive a request to view details for one or more working crews 134. The web service 136 can generate a list of workers assigned to a respective working crew for each of the working crews 134. The lists can be sent as a mapping of working crews 134 in response to the request. The entries on each list of working crews 134 can include an identifier for a user account stored in users and groups 118 and detailed information corresponding to the user account.

In box 724, the worksite service 115 can send a list of available safety training materials to client devices 106 associated with the user accounts assigned to the task. The safety training materials can be stored in the data store 112, such as in job briefings 133. A client device 106 can send a request to download one of the available safety training materials. In one example, the sync application 145 sends a request to synchronize the available safety training materials to the sync service 139. The web service 136 can also receive a request and send the requested safety training material to the client application 142.

In box 727, the worksite service 115 can receive a confirmation of completion of safety training materials. The worksite service 115 can receive electronic signatures from client devices 106 confirming that the safety training materials have been read or completed. The worksite service 115 can track which user accounts have confirmed completion of each of the safety training materials using data store 112.

In box 730, the worksite service 115 can receive a request for details describing which user accounts have completed a safety training material. In one example, the client application 142 is a web browser and submits the request to the web service 136 through a web page served by the web service 136. The worksite service 115 can restrict access to the details based on permissions 121 associated with a requesting user account in users and groups 118. In one example, permissions 121 is configured such that only members of the group "Foreman" can view the details.

In box 733, the worksite service 115 can send status information describing which of the user account have confirmed reading a safety training material. As an example, the status information can detail which user accounts have provided an electronic signature. The electronic signatures can be provided by a user through an input device 151 on a client device 106. As an example, a handwritten signature can be received from a touch screen interface on the client device 106. As another example, a biometric signature can be received through an input device 151, such as a fingerprint or a retina. In some embodiments, two factor electronic signatures are required. The client application 142 can require both a handwritten signature and a biometric signature to confirm a user account has completed a safety training material.

Figure 8:
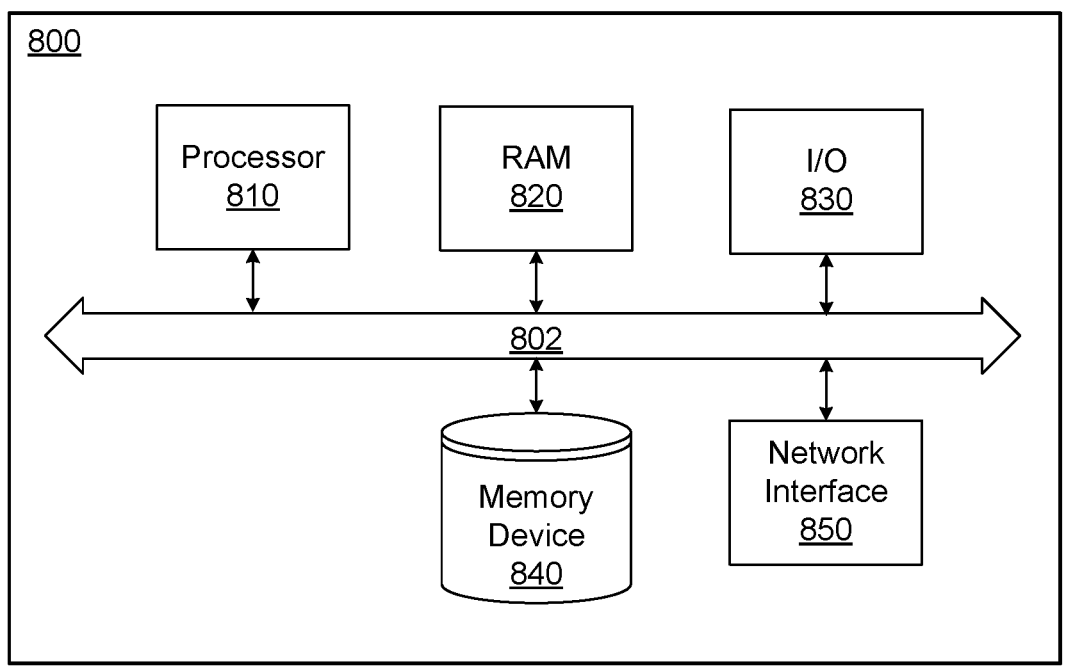
FIG. 8 is a schematic block diagram that illustrates an example computing environment or client device employed in the networked environment of FIG. 1 according to various embodiments.

With reference to FIG. 8, shown is a schematic block diagram of the computing environment 103 and client device 106 according to an embodiment of the present disclosure. The computing environment 103 and client device 106 include one or more computing devices 800. Each computing device 800 includes at least one processor circuit, for example, having a processor 810 and a memory 840, both of which are coupled to a local interface 802. To this end, each computing device 800 may comprise, for example, at least one server computer or like device. The local interface 802 may comprise, for example, a data bus with an accompanying address/control bus or other bus structure as can be appreciated.

Stored in the memory 840 are both data and several components that are executable by the processor 810. In particular, stored in the memory 840 and executable by the processor 810 are a web service 136, a sync service 139, a client application 142, a sync application 145, and potentially other applications. Also stored in the memory 840 may be a data store 112 or 157 and other data. In addition, an operating system may be stored in the memory 840 and executable by the processor 810.

It is understood that there may be other applications that are stored in the memory 840 and are executable by the processor 810 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 840 and are executable by the processor 810. In this respect, the term "executable" means a program file that is in a form that can ultimately be run by the processor 810. Examples of executable programs may be, for example, a compiled program that can be translated into machine code in a format that can be loaded into a random access portion of the memory 840 and run by the processor 810, source code that may be expressed in proper format such as object code that is capable of being loaded into a random access portion of the memory 840 and executed by the processor 810, or source code that may be interpreted by another executable program to generate instructions in a random access portion of the memory 840 to be executed by the processor 810, etc. An executable program may be stored in any portion or component of the memory 840 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 840 is defined herein as including both volatile and nonvolatile memory and data storage components. Volatile components are those that do not retain data values upon loss of power. Nonvolatile components are those that retain data upon a loss of power. Thus, the memory 840 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The RAM 820 may be a part of or separate from memory device 840. The ROM may comprise, for example, a programmable read-only memory (PROM), an erasable programmable read-only memory (EPROM), an electrically erasable programmable read-only memory (EEPROM), or other like memory device.

Also, the processor 810 may represent multiple processors 810 and/or multiple processor cores and the memory 840 may represent multiple memories 840 that operate in parallel processing circuits, respectively. In such a case, the local interface 802 may be an appropriate network that facilitates communication between any two of the multiple processors 810, between any processor 810 and any of the memories 840, or between any two of the memories 840, etc. The local interface 802 may comprise additional systems designed to coordinate this communication, including, for example, performing load balancing. The processor 810 may be of electrical or of some other available construction.

Although web service 136, a sync service 139, a client application 142, a sync application 145, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 7 shows the functionality and operation of an implementation of portions of the worksite service 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 810 in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. Further, in some embodiments, one or more of the blocks shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including web service 136, sync service 139, client application 142, and sync application 145, that comprises software or code can be embodied in any non-transitory computer-readable medium for use by or in connection with an instruction execution system such as, for example, a processor 810 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including web service 136, sync service 139, client application 142, and sync application 145, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices in the same computing environment 103. Additionally, it is understood that terms such as "application," "service," "system," "engine," "module," and so on may be interchangeable and are not intended to be limiting.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A non-transitory computer-readable medium embodying a program that, when executed by a mobile computing device, causes the mobile computing device to at least: authenticate a user account with an application server based at least in part on an authentication credential; render a first user interface comprising a subset of a first plurality of user interface elements, the subset being based at least in part on permissions associated with the user account; render a second user interface configured to receive information describing an incident subsequent to receiving a manipulation of a first user interface element of the subset of the first plurality of user interface elements, the second user interface comprising a second plurality of user interface elements configured to create a new incident report; capture, via a camera, at least one photograph depicting the incident; store the new incident report including the information describing the incident and the at least one photograph depicting the incident in a local data store corresponding to the mobile computing device; synchronize the local data store with the application server by at least pushing the new incident report to the application server, capture, via a camera, a photograph depicting a worksite associated with a work order; compare the photograph depicting the worksite associated with the work order to a plurality of photographs depicting different worksites, wherein the comparison comprises comparing a plurality of buildings identified at the worksite within the photograph to a plurality of respective buildings in each of the plurality of photographs; determine an identifier corresponding to the worksite and the work order based at least in part on the comparison; and render, in response to determining the identifier, a third user interface including details of the work order corresponding to the identifier.

2. The non-transitory computer-readable medium of claim 1, wherein the identifier comprises at least one of a bar code or a QR code.

3. The non-transitory computer-readable medium of claim 1, wherein the program further causes the mobile computing device to synchronize data in the local data store with the application server in response to receiving a manipulation of a second user interface element of the first plurality of user interface elements.

4. The non-transitory computer-readable medium of claim 3, wherein synchronizing the data in the local data store with the application server comprises pushing the data in the local data store to the application server.

5. The non-transitory computer-readable medium of claim 3, wherein synchronizing the data in the local data store with the application server comprises pulling data from the application server and storing the data from the application server in the local data store.

6. The non-transitory computer-readable medium of claim 5, wherein the data from the application server comprises at least one work order created subsequent to a past synchronization event.

7. The non-transitory computer-readable medium of claim 1, wherein the program further causes the mobile computing device to synchronize data in the local data store with the application server following a predefined interval.

8. The non-transitory computer-readable medium of claim 1, wherein synchronizing the local data store with the application server further comprises queueing the synchronization of the local data store until a WiFi connection is available.

9. A system comprising: a data store; a mobile computing device communicably coupled to the data store, the mobile computing device being configured to at least: generate a first user interface comprising a subset of a first plurality of user interface elements, the subset being based at least in part on a classification of a user account; generate a second user interface configured to receive information describing an incident subsequent to receiving a manipulation of a first user interface element of the subset of the first plurality of user interface elements, the second user interface comprising a second plurality of user interface elements; capture at least one photograph via a camera of the mobile computing device, the at least one photograph depicting the incident; store a new incident report including the information describing the incident and the at least one photograph in the data store corresponding to the mobile computing device; synchronize the data store with an application server by at least pushing the new incident report to the application server; capture, via the camera, a photograph depicting a worksite associated with a work order; compare the photograph depicting the worksite associated with the work order to a plurality of photographs depicting different worksites, wherein the comparison comprises comparing a plurality of buildings identified at the worksite within the photograph to a plurality of respective buildings in each of the plurality of photographs; determine an identifier corresponding to the worksite and the work order based at least in part on the comparison; and render, in response to determining the identifier, a third user interface including details of the work order corresponding to the identifier.

10. The system of claim 9, wherein the new incident report is pushed to the application server in response to receiving a manipulation of a first user interface element of the second plurality of user interface elements.

11. The system of claim 9, wherein the at least one photograph is captured via the camera of the mobile computing device in response to receiving a manipulation of a second user interface element of the second plurality of user interface elements.

12. The system of claim 9, wherein a third user interface element of the second plurality of user interface elements comprises a plurality of data fields configured to receive the information describing the incident.

13. The system of claim 12, wherein the new incident report is stored in the data store in response to receiving a manipulation of a fourth user interface element of the second plurality of user interface elements.

14. The system of claim 9, wherein the mobile computing device is further configured to at least render the first user interface subsequent to receiving a manipulation of a fourth user interface element of the second plurality of user interface elements.

15. A method comprising: authenticating, via at least one computing device, a user account with an application server based at least in part on an authentication credential; rendering, via the at least one computing device, a first user interface comprising a subset of a first plurality of user interface elements, the subset being based at least in part on permissions associated with the user account; rendering, via the at least one computing device, a second user interface configured to receive information describing an incident subsequent to receiving a manipulation of a first user interface element of the subset of the first plurality of user interface elements, the second user interface comprising user interface elements configured to create a new incident report; capturing, via the at least one computing device, at least one photograph via a camera of the at least one computing device, the at least one photograph depicting the incident; storing, via the at least one computing device, the new incident report including the information describing the incident and the at least one photograph in a local data store corresponding to the at least one computing device; synchronizing, via the at least one computing device, the local data store with the application server by at least pushing the new incident report to the application server; capturing, via the at least one computing device, a photograph depicting a worksite associated with a work order; comparing, via the at least one computing device, the photograph depicting the worksite associated with the work order to a plurality of photographs depicting different worksites, wherein the comparison comprises comparing a plurality of buildings identified at the worksite within the photograph to a plurality of respective buildings in each of the plurality of photographs; determining, via the at least one computing device, an identifier corresponding to the worksite and the work order based at least in part on the comparison; and rendering, via the at least one computing device, a third user interface comprising a third plurality of user interface elements in response to determining the identifier, a first user interface element of the third plurality of user interface elements comprising details of the work order corresponding to the identifier.

16. The method of claim 15, wherein the identifier comprises at least one of a bar code or a QR code.

17. The method of claim 15, wherein the first user interface element of the third plurality of user interface elements further comprises details of at least one other work order related to the work order.

18. The method of claim 17, wherein the details of the work order corresponding to the identifier comprise the identifier and a plurality of links corresponding to information about the work order.

19. The method of claim 17, further comprising searching, via the at least one computing device, for at least one work order of a plurality work orders subsequent to receiving a manipulation of a second user interface element of the third plurality of user interface elements.

20. The method of claim 15, further comprising rendering, via the at least one computing device, the first user interface subsequent to receiving a manipulation of a third user interface element of the third plurality of user interface elements.

* * * * *